Sept. 19, 1944.  W. WILLIAMS  2,358,370
TIRE DEFLATION SIGNAL
Filed Aug. 10, 1942  2 Sheets-Sheet 1
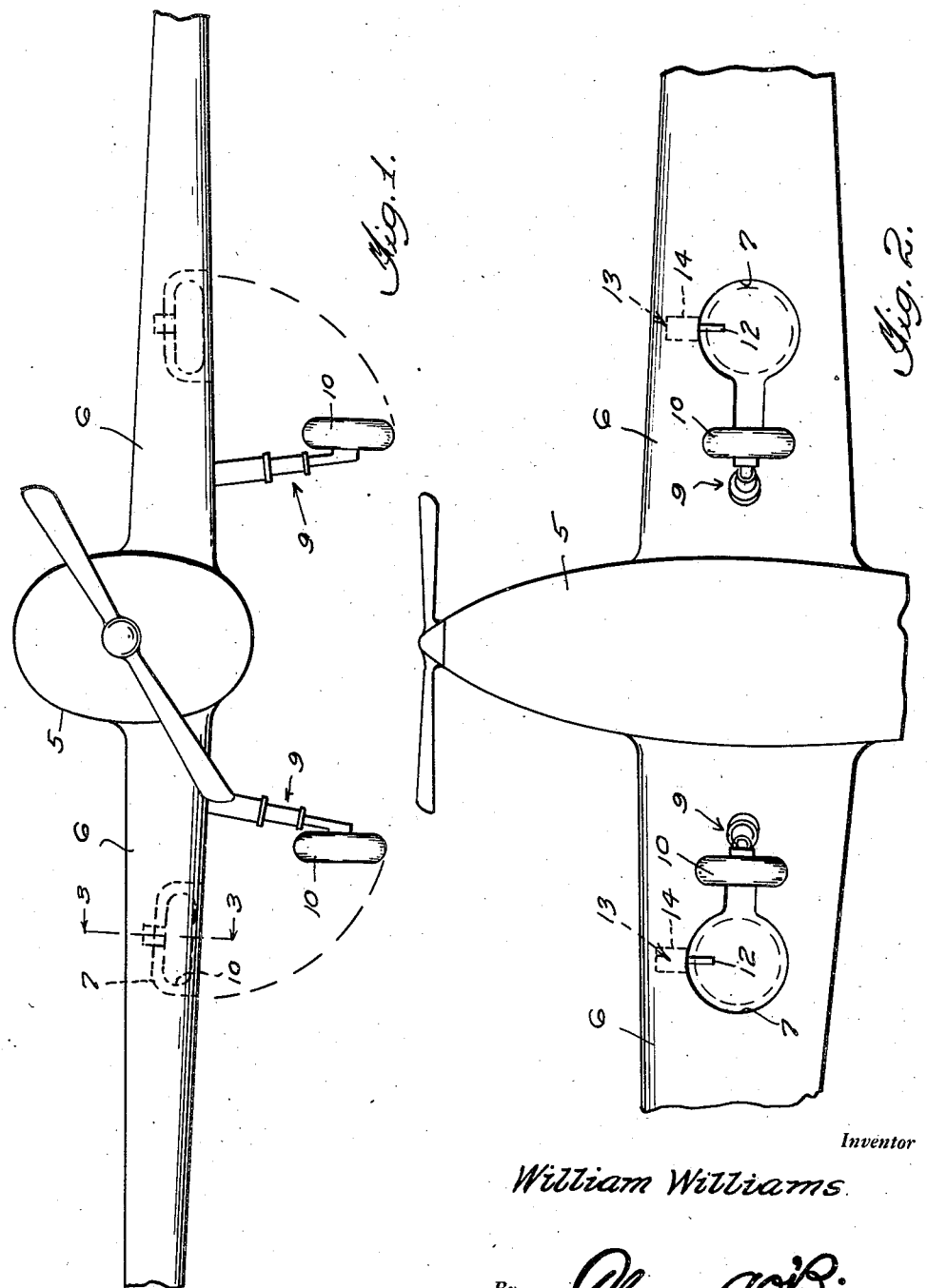
Inventor
William Williams.
By Clarence A. O'Brien
and Harvey B. Jacobson
Attorneys Sept. 19, 1944.　　　　W. WILLIAMS　　　　2,358,370
TIRE DEFLATION SIGNAL
Filed Aug. 10, 1942　　　2 Sheets-Sheet 2
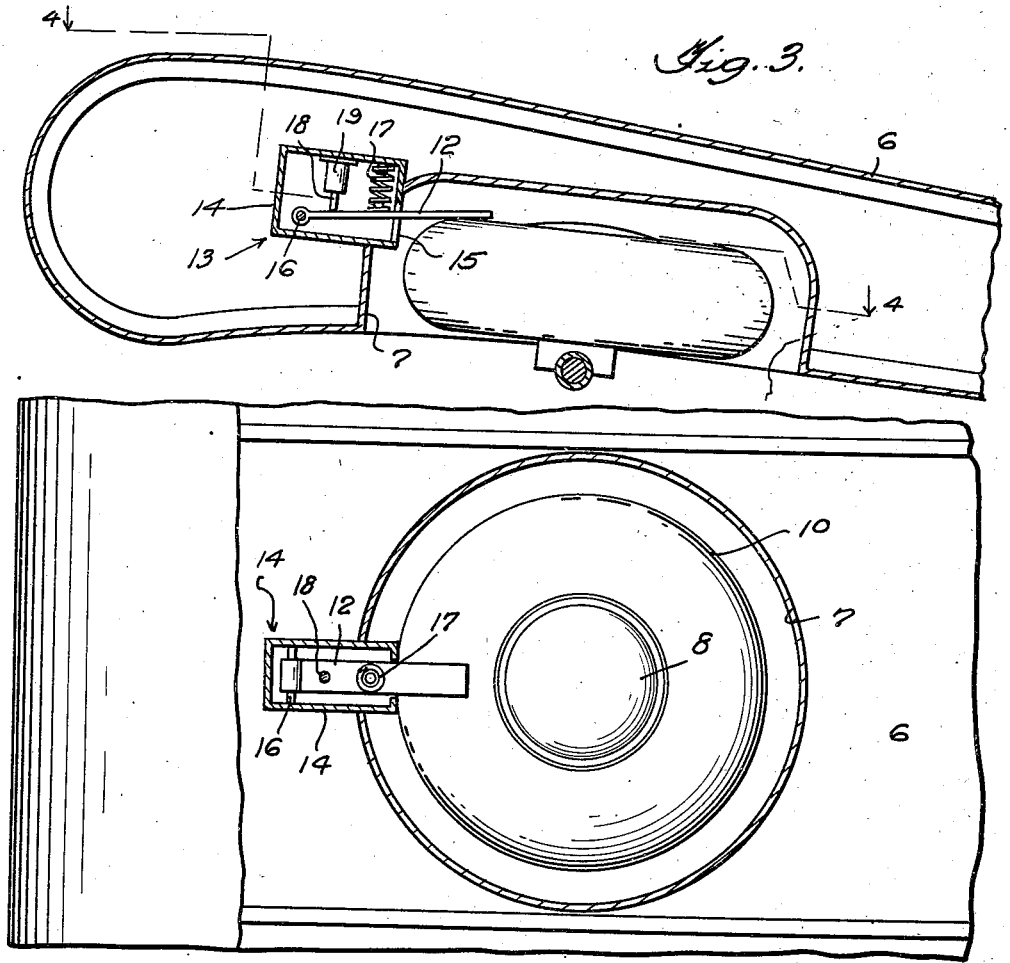
Fig. 3.
Fig. 4.
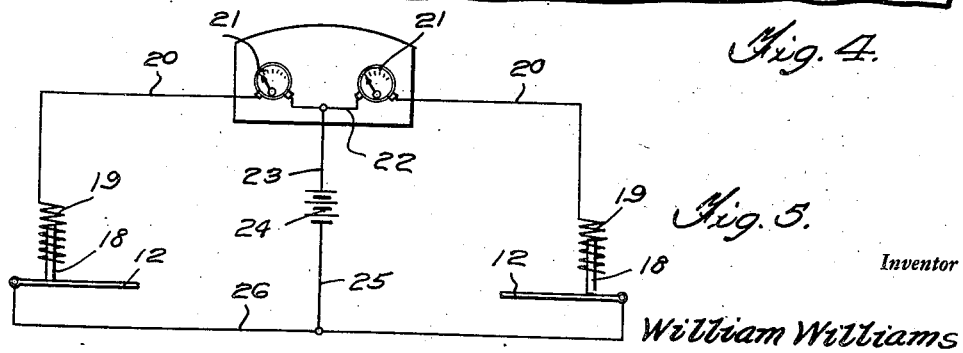
Fig. 5.
Inventor
William Williams
By Clarence A. O'Brien
and Harvey B. Jacobson
Attorneys Patented Sept. 19, 1944

2,358,370

UNITED STATES PATENT OFFICE 2,358,370

TIRE DEFLATION SIGNAL

William Williams, Columbus, Ohio

Application August 10, 1942, Serial No. 454,289

1 Claim. (Cl. 177—311)

This invention relates to new and useful improvements in signals and more particularly to tire deflation signals.

At present, aviators have no way of detecting whether the tires of their planes have sufficient air pressure to permit a safe landing. An unusually soft tire will obviously cause a drag which may result in an accident, especially if the other complementary wheel contains a normal pressure.

Therefore, the principal object of the present invention is to provide low pressure detecting means for aircraft pneumatic tires.

Other objects and advantages of the invention will become apparent to the reader of the following description.

In the drawings:

Figure 1 represents a fragmentary front elevational view of an aeroplane equipped with the present invention.

Figure 2 is a fragmentary bottom plan view.

Figure 3 is an enlarged sectional view taken substantially on the line 3—3 of Figure 1.

Figure 4 is a fragmentary horizontal sectional view taken substantially on the line 4—4 of Figure 3.

Figure 5 is a diagrammatic view showing the electrical connection between the electrical devices involved.

Referring to the drawings wherein like numerals designate like parts, it can be seen that numeral 5 denotes the fuselage of a conventional airplane, while numerals 6, 6 denote the usual wings. This type of aircraft has pockets 7 in the undersides of its wings for receiving the wheels 8 of retractible landing wheel structures 9. Each of these wheels has a tire 10 which nests in the pocket 7 in the manner shown in Figure 3.

In nesting in these pockets 7, the tires will exert themselves against the feeler 12 of the switch unit 13 of the present invention. This unit 13 comprises a box 14 installed in one side portion of the corresponding pocket 7, the feeler 12 operating through a slot 15 in the box swingable on a pin 16 located within the box. This feeler 12 operates against a compression spring 17 and is intended to operate a core or slide 18 operating within a resistance element 19.

As can be seen in Figure 5, each of the resistance elements 19 is connected by a conductor 20 to a corresponding indicating instrument 21, preferably calibrated in pounds pressure, the remaining sides of the instrument 21 being connected as at 22 with a conductor 23 extending thereof to a battery 24. This battery 24 is, in turn, connected by a jumper 25 to a conductor 26 running between the feelers 12, 12.

Obviously, when a soft tire 10 moves into a pocket 7, there is not sufficient bulk to force the slide bore 18 all the way into the resistance 19 and this allows for a drop in the reading of the corresponding instrument 21.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In an aircraft having a wing provided with a pocket therein, and a landing wheel having a pneumatic tire and retractible upwardly into said pocket, an indicating instrument in said aircraft, an electric circuit for operating said instrument, and means operative by pressure of the retracted wheel tire against the same to variably control said circuit comprising a spring-tensioned feeler finger swingably mounted in said wing to project into said pocket and operative in different degree according to different inflation pressures in said tire, and a variable resistance in said wing interposed in the circuit and including a slide operative into different positions by said finger to vary the magnitude of the resistance set up in said circuit in accordance with the degree of operation of said finger, whereby the magnitude of the resistance included in the circuit is a function of the tire pressure.

WILLIAM WILLIAMS.